April 9, 1935. E. A. REUSSENZEHN 1,996,976
SCALE POISE
Filed Jan. 29, 1932 2 Sheets-Sheet 1

INVENTOR
Ernest A. Reussenzehn
BY his ATTORNEY

April 9, 1935.  E. A. REUSSENZEHN  1,996,976
SCALE POISE
Filed Jan. 29, 1932  2 Sheets-Sheet 2
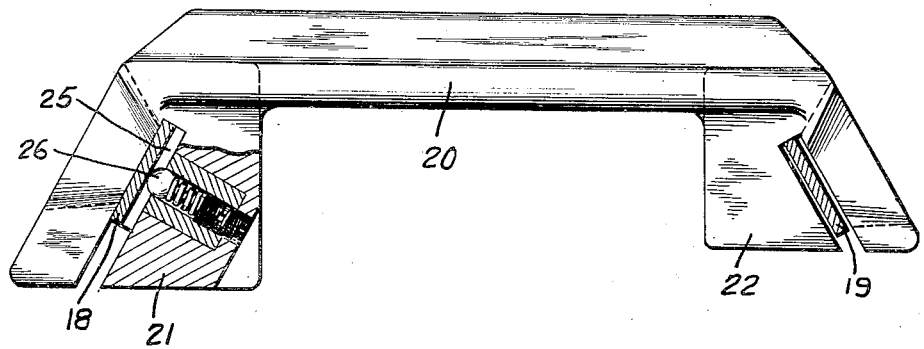
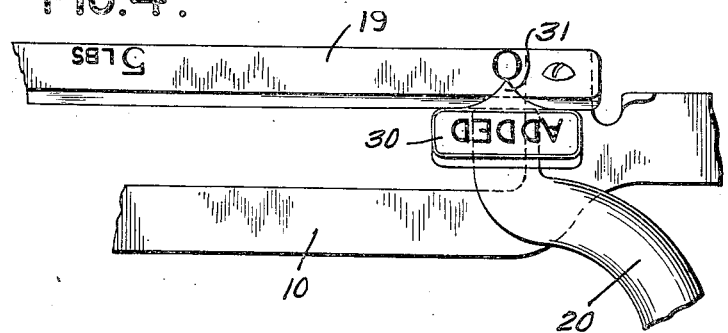

Patented Apr. 9, 1935

1,996,976

UNITED STATES PATENT OFFICE 1,996,976

SCALE POISE

Ernest A. Reussenzehn, Dayton, Ohio, assignor, by mesne assignments, to The Hobart Manufacturing Company, Troy, Ohio, a corporation of Ohio Application January 29, 1932, Serial No. 589,603

2 Claims. (Cl. 265—49)

This case relates to weighing scales and particularly to the poise-carrying beams thereof.

The object of the invention is to provide a combination of beam and poise which will indicate on the merchant's and customer's side of a scale, the setting of the poise.

Further, the object is to provide a beam with a graduated arm on opposite sides of a scale, each arm carrying a poise, and the poises being jointly operated.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 3 is a section on line 3—3 of Fig. 1; and

Fig. 4 is a plan view of a modification of the customer's indicating means viewed similarly to the upper portion of Fig. 1.

Figure 1:
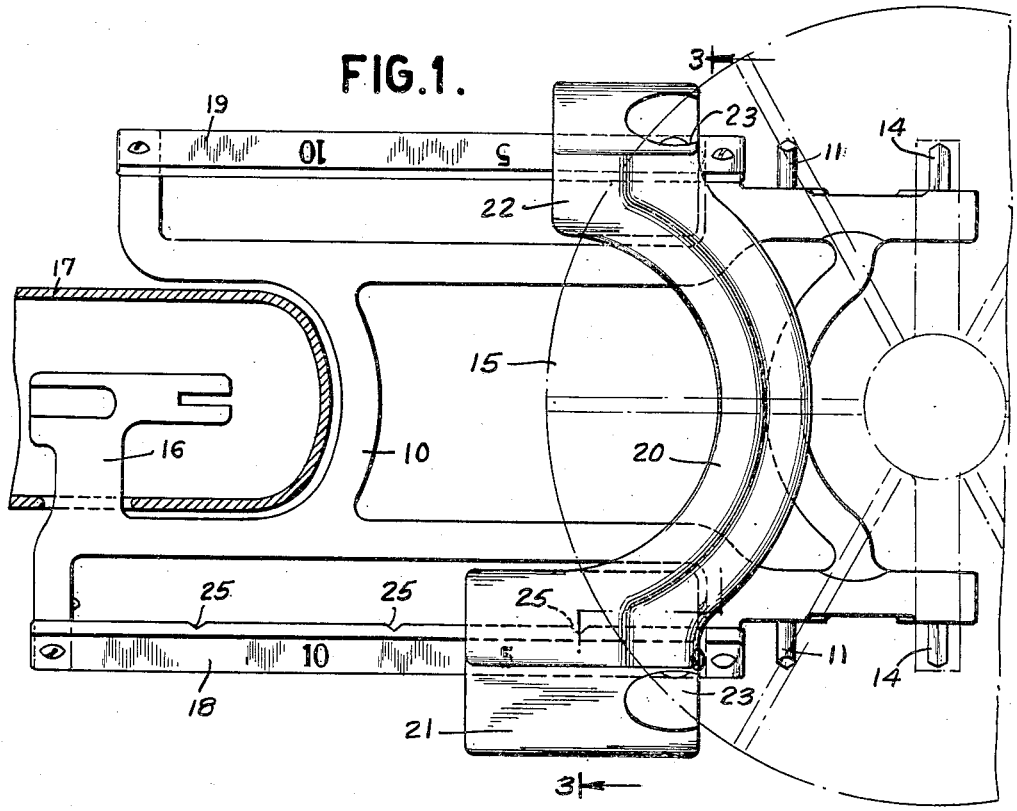
Fig. 1 is a plan section through the scale.
Figure 2:
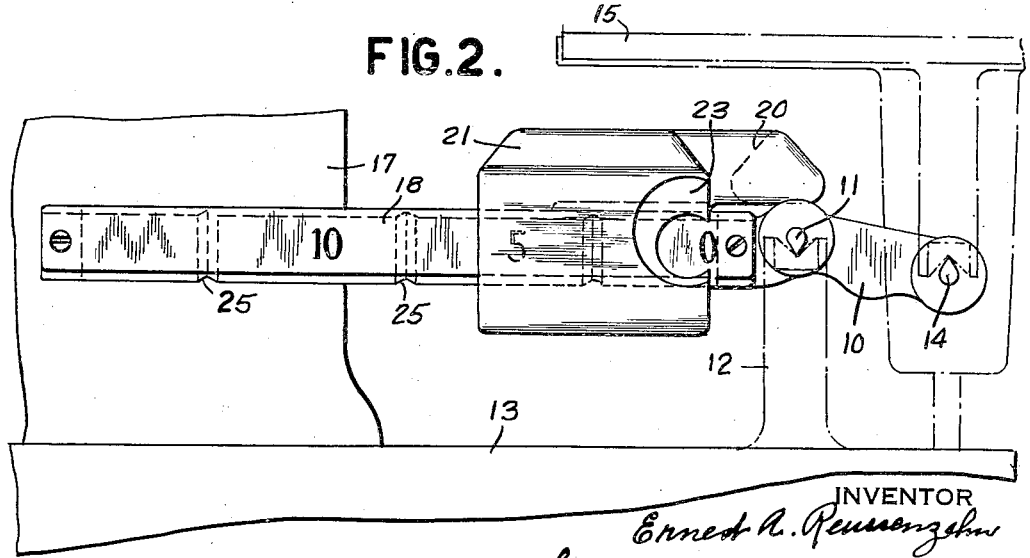
Fig. 2 is a view of the lower part of the scale from the merchant's side.

The invention has been applied for purposes of the disclosure to a scale similar to the one shown in Patent No. 1,645,326.

Referring to the drawings in detail, 10 is the base lever of a scale similar to the one shown in aforesaid patent. The lever is of the divided or bifurcated type, each furcation or longitudinal arm carrying a knife edge pivot 11 to fulcrum the lever on standards 12 rising from the base 13. Each furcation also has a knife edge 14 for supporting the platform 15. The inner end of the lever has a lateral extension 16 projecting into the housing 17 and to which the automatic counterbalancing and indicating means (not shown) is connected. Secured to opposite furcations of lever 10 are graduated bars 18 and 19.

Extending across the lever is a poise assembly comprising a curved bar 20 integrally provided at opposite ends with poises 21 and 22 respectively riding on bars 18 and 19. Each poise has an index portion 23 which coacts with indications on the bar to indicate the backweighting effect of the poises on the scale. The bar 18 has on its inner side three notches 25 to receive a spring pressed ball 26 held in poise 21. When the poise indices 23 are opposite "0", "5" or "10" on the bars 18 and 19, the ball 26 seats in a notch 25 to retain the poise assembly in position. The bar 20 is curved to accommodate the curve in the housing 17 when the poises are set at indications "10".

When the poise assembly is at "0", then the capacity of the scale is only that of the automatic counterbalance. When the poise assembly is moved to indicate "5" on bars 18 and 19, then the capacity of the scale has been increased by five pounds; similarly, when the poise assembly is at "10", the capacity has been increased by ten pounds.

It may be noted that by dividing the poise weight so that a part is acting on each furcation of the lever, the tendency of the lever to tilt sidewise on its fulcrum bearings is minimized.

In Fig. 4 is shown a modification of the customer's indicating means viewed similarly to the upper portion of Fig. 1. In this modification, the arm 20 carries adjacent bar 19 a tab 30 having a pointer 31 coacting with the numbers on bar 19 to indicate the added offsetting weight on the scale. The inscription "Added" on tab 30 denotes clearly that additional weight has been added to the scale to offset the load. When employing this form of customer's indication, the greater portion of the poise weight is on arm 18.

While the several modifications shown and described are preferred forms of the invetnion, it is to be understood that other modifications and changes may be made within the scope of mechanical skill without departing from the spirit of the invention. I therefore desire to be limited only by the scope of the following claims:

1. In a scale, a lever having spaced arms between portions of which projects a scale part obstructing the view of one arm portion by an observer at the opposite side of said scale part, each arm having indicating figures readable in upright position by an observer at the same side of the scale part, a poise movable along said lever and having indexes, one for each arm, movable from points on said arms in advance of and remote from the scale part to points on the arm portions alongside the scale part, and a rigid connection between said indexes extending transversely of the lever and having an intermediate portion spaced from the indexes in a direction longitudinal of the lever to occupy a position in advance of and clear of the scale part while the indexes are alongside the scale part.

2. In a scale, a lever having spaced arms between portions of which a scale part projects vertically to obstruct the view of an arm portion by an observer at the opposite side of the scale part, each arm having indicating figures readable in upright position by an observer at the same side of the scale part, a poise movable along said lever, and having indexes, one for each arm, movable from points remote from and in advance of the scale part to points on said arm portions along the sides of the scale part, and a rigid connection between said indexes so arranged and constructed as to cause adjustment of the poise to effect such movement of the indexes simultaneously without interference by the scale part.

ERNEST A. REUSSENZEHN.